US008182255B2

(12) United States Patent  
Plantà Torralba et al.

(10) Patent No.: US 8,182,255 B2
(45) Date of Patent: May 22, 2012

(54) DEVICE AND APPARATUS FOR SELECTIVE DEPOSITION OF MOLTEN PLASTIC MATERIAL AND METHOD OF MANUFACTURE BY SELECTIVE DEPOSITION

(75) Inventors: Francisco Xavier Plantà Torralba, Barcelona (ES); Francesco Puliga, Barcelona (ES); Alvaro Pallares Bejarano, Barcelona (ES)

(73) Assignee: Fundacio Privada Ascamm, Barcelona (ES)

( * ) Notice: Subject to any disclaimer, the term of this patent is extended or adjusted under 35 U.S.C. 154(b) by 0 days.

(21) Appl. No.: 12/676,423

(22) PCT Filed: Aug. 25, 2008

(86) PCT No.: PCT/ES2008/000570
§ 371 (c)(1),
(2), (4) Date: May 14, 2010

(87) PCT Pub. No.: WO2009/030791
PCT Pub. Date: Mar. 12, 2009

(65) Prior Publication Data
US 2010/0239785 A1 Sep. 23, 2010

(30) Foreign Application Priority Data

Sep. 4, 2007 (ES) .................................. 200702390

(51) Int. Cl.
B29B 13/08 (2006.01)
B29C 47/36 (2006.01)
(52) U.S. Cl. ................ 425/174.2; 264/211.22; 264/444; 264/442
(58) Field of Classification Search ............ 264/211.22, 264/444, 442; 425/147.2
See application file for complete search history.

(56) References Cited

U.S. PATENT DOCUMENTS

| 6,036,467 | A  | 3/2000  | Jameson      |
| 6,519,500 | B1 | 2/2003  | White        |
| 6,814,823 | B1 | 11/2004 | White        |
| 2002/0019683 | A1 | 2/2002 | White et al. |

(Continued)

FOREIGN PATENT DOCUMENTS

EP 0 394 958 A2 10/1990

(Continued)

OTHER PUBLICATIONS

Michaeli, W. et al., "New plastification concepts for micro injection moulding," Microsystem Technologies 8 (2002) 55-57.

(Continued)

Primary Examiner — Yogendra Gupta
Assistant Examiner — Alison Hindenlang
(74) Attorney, Agent, or Firm — RatnerPrestia

(57) ABSTRACT

Device and apparatus for selective deposition of molten plastic material and method of manufacture by selective deposition. The device and the apparatus include a melting chamber communicated with a portion of a sonotrode of an ultrasonic transducer, a passage for feeding plastic material, and at least one outlet opening for supplying molten plastic material dropwise or continuously. A feeding of plastic material to the melting chamber is provided. The method includes feeding plastic material to the melting chamber configured in a device for selective deposition installed in a head of a piece of industrial manufacturing equipment, which is moved according to a strategy of its path defined by numerical control on a deposition area, and pouring plastic material melted by ultrasound through the outlet opening.

11 Claims, 3 Drawing Sheets

U.S. PATENT DOCUMENTS

2006/0158456 A1 * 7/2006 Zinniel et al. .................. 345/589

FOREIGN PATENT DOCUMENTS

| EP | 0 426 363 A2 | 5/1991 |
| EP | 0 833 237 A2 | 4/1998 |
| ES | 2 323 624 | 7/2009 |
| WO | WO 2004/024415 A1 | 3/2004 |

OTHER PUBLICATIONS

International Search Report for PCT International Application No. PCT/ES2008/000570 mailed Jan. 20, 2009.

International Preliminary Report on Patentability for PCT International Application No. PCT/ES2008/000570 dated Nov. 27, 2009.

* cited by examiner

DEVICE AND APPARATUS FOR SELECTIVE DEPOSITION OF MOLTEN PLASTIC MATERIAL AND METHOD OF MANUFACTURE BY SELECTIVE DEPOSITION

This application is a U.S. National Phase Application of PCT International Application No. PCT/ES2008/000570, filed Aug. 25, 2008.

FIELD OF THE INVENTION

The present invention generally relates to a device for selective deposition of molten plastic material and to an apparatus for making parts which can form prototypes, in which said device for deposition is integrated.

The invention also relates to a method for manufacturing parts which can form prototypes by means of a technique of selective deposition of molten plastic material, which uses ultrasonic vibration as an energy source for a controlled melting of said plastic material to be deposited for the formation of a three-dimensional object resulting from the superposition of a plurality of layers. Said plastic material is any polymeric material and can be supplied in any morphology, such as pellets, powder, filaments, sheets, gel, etc.

BACKGROUND OF THE INVENTION

The state of the art describes a method for manufacturing three-dimensional prototype parts by means of the extrusion of a thermoplastic material in a semifusion state through a nozzle depositing the intended model layer by layer. Patent EP-B 1-0426363 describes an apparatus and a method for creating three-dimensional objects by means of FDM (Fused Deposition Modeling) technology, comprising a movable dispensing head (with at least three degrees of freedom), with a hole for discharging plastic material in a fluid state which is reached by electric resistance heating means close to the dispensing hole and including means for supplying plastic material to a plastification enclosure.

Due to the increase of innovation required in current technology, the manufacture of a prototype with features similar to the end product is essential. Said prototypes were obtained up until now with machinery, such as that mentioned in patent EP-B1-0426363, which given its structural complexity and maintenance requirements required a very high investment, as well as the use of suitable materials (guaranteed by the manufactured) for said machinery of considerable cost, all of this affecting the price of the end product.

W. Michaeli, A. Spennemann, R. Gartner (2002), New plastification concepts for micro injection moulding, Microsystem Technologies 8, 55-57, Springer-Verlag 2002 describes a proposal for the plastification of microparts by ultrasound and describes a test unit. It is indicated in this reference that different parameters of the machine such as the efficiency of the ultrasonic generator, amplitude and course of the sonotrode, activation power, etc., were measured by means of this unit.

Patent application ES-A-200702245 describes an ultrasonic device for molding plastic microparts in which an ultrasonic vibration element is arranged next to a chamber adjacent to a molding cavity of a mold, said chamber having an inlet for feeding plastic material and means having been provided for an end of the ultrasonic vibration element, which is a sonotrode, to interfere with the fed plastic material and to exert a determined pressure thereon.

U.S. Pat. No. 6,814,823 and U.S. Pat. No. 6,519,500 describe a method for manufacturing parts by the controlled deposition of layers in which the use of ultrasound as a form of energy to join the layers previously formed by means of a deposition technology known in itself has been provided.

U.S. Pat. No. 6,036,467 describes an apparatus for the extrusion of fibers with auxiliary ultrasonic means for melting the fibers which comprises a melting chamber for melting plastic material by means of ultrasound with a passage for feeding molten and pressurized plastic material and an outlet opening for the exit of such material.

International application WO-A1-2004/024415 discloses a similar apparatus in which the material in a molten state is injected into a chamber in which a sonotrade is located.

Various apparatuses are known in the state of the art which allow a three-dimensional movement of a head for deposition of plastic material, being able to mention to that effect the one described in application US-A1-2002/0019683.

BRIEF DESCRIPTION OF THE INVENTION

The present invention proposes a new technology which is materialized in an ultrasonic device which is integrated in an assembly for the plastification and supply of molten plastic material, an apparatus in which said device is integrated and a method for supplying plastic material in a molten state dropwise or continuously on a surface for the formation of a generally three-dimensional part by means of successive layers.

With the use of the present invention it is possible to manufacture parts, saving considerably in initial costs, since the proposed ultrasonic device can be joined to any industrial equipment (such as a machining apparatus or a robotic device, etc.) with at least three degrees of freedom, which involves a considerable decrease of the initial investment.

The present invention, unlike the mentioned background documents, allows using any type of bulk plastic material without the limitations of overcoming demands by the manufacturers of the machinery, and the plastic material to be supplied to the device can even be formulated and added to by the user himself of the equipment in question.

The present invention generally relates to a device for selective deposition of molten plastic material which comprises a melting chamber for melting said plastic material by ultrasonic energy, provided with an outlet opening for a controlled pouring or supply of plastic material, which in one embodiment can be supplied molten dropwise, whereas in another example it can be supplied continuously.

According to the principles of the invention the mentioned melting chamber is communicated with:
- a portion, generally an end, susceptible of vibration, of a sonotrode of an ultrasonic transducer;
- a passage for feeding plastic material; and
- at least one outlet opening for supplying molten plastic material dropwise or continuously, which opening is joined to a distributing body comprising one or more nozzles.

The mentioned melting chamber, with an adjustable volume (by moving the sonotrode in a precise manner) is thus integrated in an assembly for the plastification of said plastic material by ultrasonic energy and includes a feeding mechanism configured to transport a controlled volume of said plastic material to the chamber.

The invention provides an apparatus incorporating the sonotrode of the ultrasonic transducer, according to a vertical arrangement, with pouring of the plastic material through a tip of an elongated casing enveloping the device, or other alternative arrangements, among which a horizontal arrangement of the sonotrode, with pouring of the plastic material to the exterior through a side outlet of an enveloping casing open at one end for feeding plastic material therethrough by pushing.

The invention is also characterized by a method for selective deposition of molten plastic material, which comprises:

feeding plastic material to a chamber for melting such material, installed in a head which is movable in a controlled manner on a deposition area and communicated with a sonotrode of an ultrasonic transducer, a passage for the entrance or feeding of plastic material and at least one dispensing opening; and depositing a series of layers on a surface by activating the sonotrode for a predetermined time while the head is being moved in a controlled manner according to a strategy of its path defined by numerical control and molten plastic material is supplied dropwise or continuously, in a controlled manner, through said dispensing opening.

The invention comprises the advantages which can be provided by the proposed device, apparatus and method derived from the constructive simplicity and high versatility of use.

BRIEF DESCRIPTION OF THE DRAWINGS

The previous and other advantages and features will be more fully understood from the following detailed description of several embodiments with reference to the attached drawings, which must be taken in an illustrative and non-limiting manner, in which.

DETAILED DESCRIPTION OF AN EMBODIMENT

Figure 1:
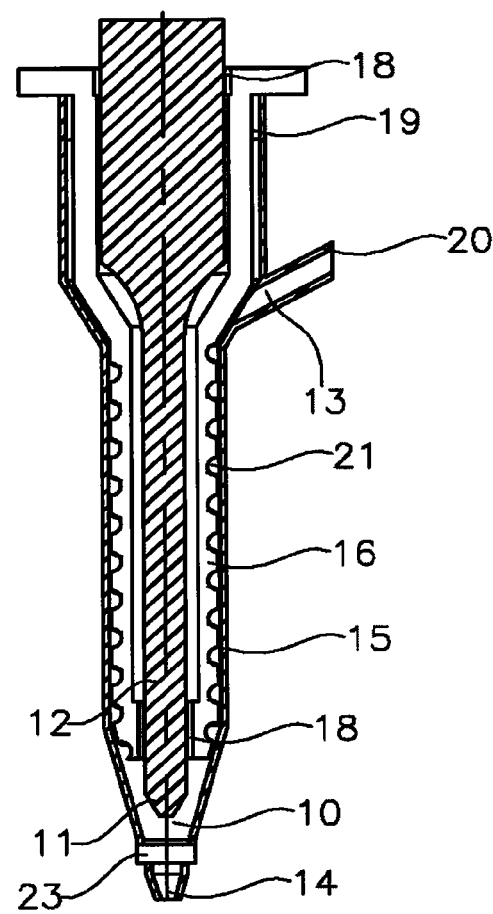
FIG. 1 is a device for selective deposition of molten plastic material which, in a preferred embodiment, incorporates a sonotrode in a vertical position.

FIG. 1 shows a device for selective deposition of molten plastic material equipped with a sonotrode in a vertical position, in which a feeding mechanism can be seen formed by a side feeding mouth 20, a passage 13 for feeding plastic material in its side part and a spindle 16, which is governed in a controlled manner and which is configured to transport said plastic material to a melting chamber 10, located in an end portion of an elongated casing 15 enveloping a sonotrode 12, said chamber 10 being communicated with an end portion 11 of said sonotrode 12 forming part of an ultrasonic transducer, which is associated with the spindle 16 through bearing supports 18 and vibrates in a longitudinal direction with respect to said casing 15. This melting chamber 10 contains an outlet opening 14 for supplying plastic material, which in one embodiment can be supplied molten dropwise, whereas in another embodiment it can be supplied continuously.

As can be seen in FIG. 1, the entire feeding mechanism described is configured coaxially to the longitudinal axis of said sonotrode 12. Thus, said spindle 16 is located in an annular cavity 21, delimited between an outer cylindrical wall provided by the inner face of the casing 15, the sonotrode 12, and bearings 18 and 19, all of them coaxial to the longitudinal axis of the sonotrode.

In addition, the device includes means (not depicted in detail, but which can be implemented by means of a simple runner) for providing a limited run movement in a longitudinal direction of the sonotrode 11, thus adjusting the volume of plastic material of said melting chamber 10 delimited by the tip of the sonotrode 12.

Figure 2:
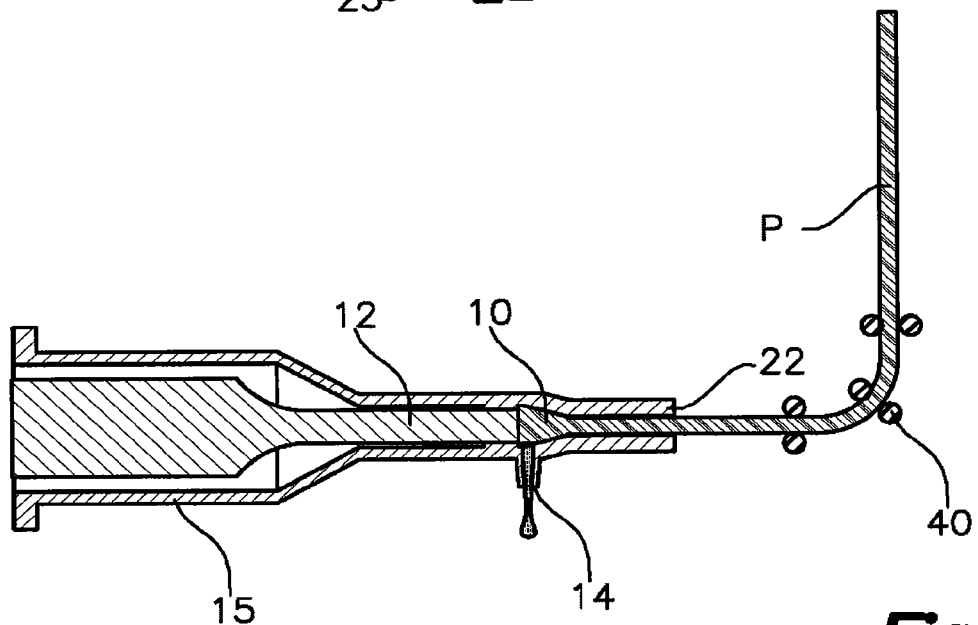
FIG. 2 is a device for selective deposition of molten plastic material which, in another embodiment, incorporates a sonotrode in a horizontal position.

FIG. 2, in turn, shows a device for selective deposition of plastic material melted by ultrasonic energy, but with a horizontal configuration of the sonotrode used. In this FIG. 2, the melting chamber 10 is located at an end portion of the casing 15 enveloping said sonotrode 12, the outlet opening 14 being on a side of the casing 15, and plastic material entering through an open end 22 of the enveloping casing 15, the plastic material P accessing in a direction which is substantially aligned with the axis of the sonotrode 12. In the embodiment shown in FIG. 2 the plastic material introduced in the device is in filament form, guided and pushed by rollers 40, although in other embodiments it could be in pellet, powder, sheet or gel form. Said plastic material is pushed into the melting chamber 10 through the mentioned open end 22 of the casing 15 by means of a system of rollers.

The plastic material P fed to the device is introduced in the melting chamber 10, melting almost instantaneously as a result of the ultrasound energy provided by the sonotrode 12, which is controlled to provide, depending on the plastic material P to be melted, a determined amount of ultrasound energy. The molten plastic material is poured to the exterior by means of a dispensing opening 14, which is associated with a, for example, detachable dispensing body, which can have one or more oriented nozzles.

The mentioned dispensing mechanism has a control system 23 (see FIG. 1) for the deposition of the material, which is integrated in the outlet opening 14 and which controls the amount of deposited material according to the molten volume in the chamber 10, assuring the correct drip or operation as well as the width of the layer in question. In FIG. 1, this control system has been formed by means of a controlled valve, details about the control system having been omitted, which control system will be remote and governed by an electronic system, with the possibility of being combined or interacting with the control system for the feeding of plastic material.

Figure 3:
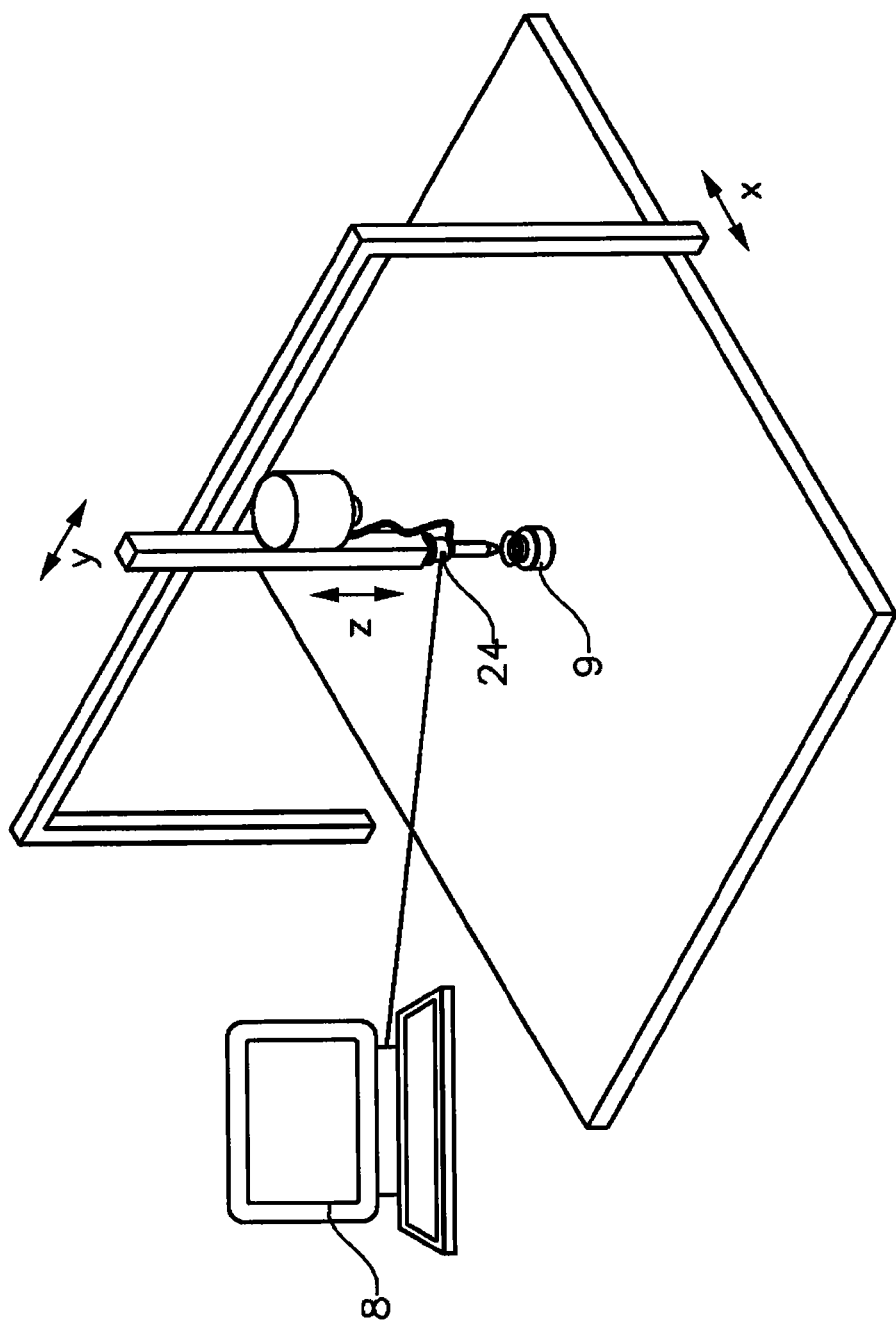
FIG. 3 shows an apparatus for making parts which comprises a head with three degrees of freedom in service to which an ultrasonic device for selective deposition of molten plastic material with a sonotrode in a vertical position is joined.
Figure 4:
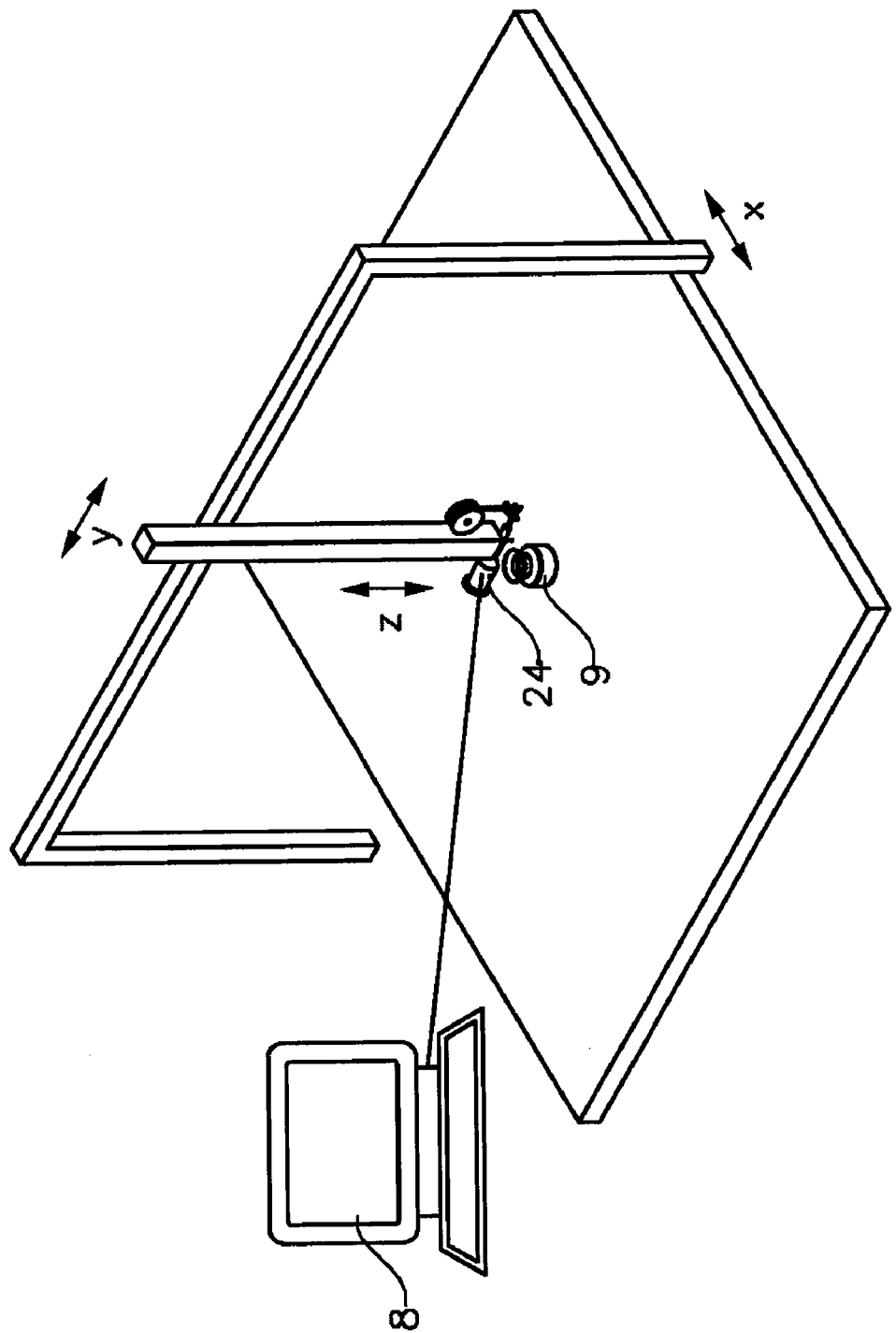
FIG. 4 shows an apparatus for making parts with a head with three degrees of freedom joined to an ultrasonic device for selective deposition of molten plastic material with a sonotrode in a horizontal position.

For a suitable operation, and as can be seen in FIGS. 3 and 4, it has been envisaged that the apparatus for making parts 9 according to the invention can be functionally coupled, by means of suitable assembly and connection accessories, in a detachable manner to a head 24 of any manufacturing equipment with at least three degrees of freedom (X, Y, Z axes).

The mentioned head 24 will generally belong to a piece of industrial equipment chosen from a group comprising at least CMM (Control Measurement Machine) equipment, equipment for manufacturing by layers or machining equipment. In a particular case said industrial equipment can be a conventional milling machine, to which the device for selective deposition will be incorporated, instead of a tool and without substantial modification of the assembly of the machine.

In a more general sense the invention also relates to a method for selective deposition of molten plastic material which comprises:

feeding plastic material to a melting chamber 10, said melting chamber 10 being configured in a device for selective deposition which is in turn arranged inside a head 24, installed in a piece of industrial equipment with the possibility of controlled movement along at least three movable axes (X, Y, Z) on an area provided for deposition and said chamber being communicated with a portion susceptible of vibration of a sonotrode 12 of an ultrasonic transducer, a passage 13 for feeding plastic material and at least one dispensing opening 14; and activating the sonotrode 12 for a predetermined time while the head 24 is being moved in a controlled manner according to a strategy of its path defined by numerical control based on the information provided by a suitable software, which has treated the solid in three dimensions of the part 9 to be reproduced, and pouring molten plastic material dropwise or continuously in an also controlled manner through said at least one opening 14 on a surface until forming a layer, and operating equivalently for the successive layers of the article to be configured.

A computer 8 as a control center has been schematized in FIGS. 3 and 4.

According to the proposed method, the feeding of plastic material to the melting chamber 10 is performed under a control of the feeding flow rate.

The method contemplates, likewise and advantageously, the incorporation of an adjustment of the volume of the chamber 10 depending on the type of plastic material or conditions of the deposition, which can be achieved in a simple manner by means of a movement of the sonotrode inside the casing of the device, moving it closer or separating it in relation to the melting chamber 10.

According to the principles of the invention, the use of differentiated deposition conditions (continuous or discontinuous deposition pattern, density of the deposited material, etc.) in the manufacture of a single part 9 has been provided. Furthermore, and in the manufacture of a single part 9, the use of two or more different materials, depending on the functionality of the part to be deposited (support, inner part, outer face or cover, etc.), has been provided.

Taking into account that the melting of the material to be deposited from the opening 14 and coming from the melting chamber 10 is dependent on the energy supplied by the vibration of the sonotrode 12, it has also been provided that a control of the energy applied to a generator of the mentioned ultrasonic transducer is carried out, taking into account the characteristics of the feeding and/or type of plastic material used, to operate in a combined manner with all the parameters.

Furthermore and in view of the variable condition of the melting chamber 10, the application of the energy applied to a generator of said ultrasonic transducer will also take into account the work volume set for the melting chamber 10, at all times.

A person skilled in the art will be able to introduce changes and modifications in the embodiments described without departing from the scope of the invention as it is defined in the attached claims.

The invention claimed is:

1. A device for selective deposition of molten plastic material, which comprises a melting chamber communicated with a passage for feeding plastic material and at least one outlet opening for supplying molten plastic material dropwise or continuously, said chamber housing a portion susceptible to vibration of a sonotrode of an ultrasonic transducer, an elongated casing enveloping said sonotrode and said sonotrode vibrating in a longitudinal direction with respect to said casing, wherein said passage for feeding plastic material includes a feeding mechanism configured to transport said plastic material to the chamber;

said feeding mechanism comprises a spindle governed in a controlled manner and located in an annular cavity delimited between an outer cylindrical wall provided by the inner face of the casing and the sonotrode wherein the annular cavity and the spindle are coaxial to the longitudinal axis of the sonotrode, said melting chamber is located in an end portion of said elongated casing enveloping said sonotrode, and one end of the melting chamber being opposite the tip of the sonotrode.

2. The device according to claim 1, further comprising means for providing a limited run movement of the sonotrode, thus adjusting the volume of plastic material of said melting chamber delimited by the tip of the sonotrode.

3. The device according to claim 1 wherein said ultrasonic transducer is associated with the spindle through bearing supports.

4. The device according to claim 1, wherein said feeding of plastic material comprises at least one side feeding mouth of the casing communicated with a distal area of said annular cavity of the melting chamber.

5. The device according to claim 1, wherein said melting chamber is located in an end portion of a casing enveloping said sonotrode, opposite to an open end of said enveloping casing, for the access of the material in a direction which is substantially aligned with the sonotrode, and said outlet opening is a side opening of the casing.

6. The device according to claim 5, further comprising a controlled unit for feeding by pushing plastic material into the melting chamber through the open end of the casing.

7. The device according to claim 1, wherein said sonotrode is controlled to provide, depending on the plastic material to be melted, an amount of ultrasound energy sufficient to melt the plastic material fed to the melting chamber almost instantaneously.

8. The device according to claim 1, wherein said plastic material is any polymeric material and can be supplied in any morphology comprising at least pellets, powder, filaments, sheets and gel.

9. The device according to claim 1, wherein said outlet opening of said melting chamber is associated with a dispensing body having one or more oriented nozzles.

10. The device according to claim 1, wherein said melting chamber is located in an end portion of an elongated casing enveloping said sonotrode, which vibrates in a longitudinal direction with respect to said casing, the melting chamber being opposite the tip of the sonotrode, and it has a control system for the deposition of the material, assuring a correct drip or operation of the deposition as well as the width of the layer in question.

11. The device according to claim 10, wherein said control system is integrated in the outlet opening and its function is to control the amount of deposited material according to the molten volume in the chamber in question.

* * * * *